United States Patent
Igarashi et al.

(10) Patent No.: US 11,437,177 B2
(45) Date of Patent: Sep. 6, 2022

(54) COIL COMPONENT AND MANUFACTURING METHOD FOR SAME

(71) Applicant: Murata Manufacturing Co., Ltd., Kyoto-fu (JP)

(72) Inventors: Akio Igarashi, Nagaokakyo (JP); Yuuji Igarashi, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 643 days.

(21) Appl. No.: 16/291,993

(22) Filed: Mar. 4, 2019

(65) Prior Publication Data
US 2019/0287710 A1    Sep. 19, 2019

(30) Foreign Application Priority Data
Mar. 14, 2018    (JP) .............................. JP2018-046107

(51) Int. Cl.
| | |
|---|---|
| H01F 17/04 | (2006.01) |
| H01F 27/26 | (2006.01) |
| H01F 27/28 | (2006.01) |
| C09J 163/00 | (2006.01) |
| H01F 27/32 | (2006.01) |
| H01F 27/29 | (2006.01) |

(52) U.S. Cl.
CPC .......... *H01F 27/263* (2013.01); *C09J 163/00* (2013.01); *H01F 27/2823* (2013.01); *H01F 27/323* (2013.01); *H01F 27/29* (2013.01)

(58) Field of Classification Search
USPC ....................................................... 336/221
See application file for complete search history.

(56) References Cited

U.S. PATENT DOCUMENTS

| | | | |
|---|---|---|---|
| 2003/0071704 A1* | 4/2003 | Toi | H01F 17/045 336/83 |
| 2010/0076119 A1* | 3/2010 | Ishizawa | H01L 24/83 523/400 |
| 2018/0019046 A1 | 1/2018 | Miyamoto | |

FOREIGN PATENT DOCUMENTS

| | | |
|---|---|---|
| JP | S59-191786 A | 10/1984 |
| JP | 2000-087000 A | 3/2000 |
| JP | 2007-059807 A | 3/2007 |
| JP | 5796603 B2 | 10/2015 |
| JP | 2018-10999 A | 1/2018 |

OTHER PUBLICATIONS

English translation of JP2014099587 (Year: 2014).*
An Office Action; "Notification of Reasons for Refusal," mailed by the Japanese Patent Office dated Jul. 7, 2020, which corresponds to Japanese Patent Application No. 2018-046107 and is related to U.S. Appl. No. 16/291,993 with English language translation.
An Office Action issued by the Japanese Patent Office dated Jun. 14, 2021, which corresponds to Japanese Patent Application No. 2018-046107 and is related to U.S. Appl. No. 16/291,993 with English language translation.

\* cited by examiner

*Primary Examiner* — Ronald Hinson
(74) *Attorney, Agent, or Firm* — Studebaker & Brackett PC

(57) ABSTRACT

In a coil component, a plate-shaped core is fixed to first and second flanges of a drum-shaped core with an adhesive interposed therebetween in a state that a lower principal surface of the plate-shaped core faces top surfaces of the first and second flanges. The adhesive is made of a hardened epoxy-based resin containing dicyandiamide.

14 Claims, 5 Drawing Sheets

COIL COMPONENT AND MANUFACTURING METHOD FOR SAME

CROSS-REFERENCE TO RELATED APPLICATION

This application claims benefit of priority to Japanese Patent Application No. 2018-046107, filed Mar. 14, 2018, the entire content of which is incorporated herein by reference.

BACKGROUND

Technical Field

The present disclosure relates to a coil component and a manufacturing method for the same. The coil component includes a drum-shaped core including a winding core portion around which a wire is wound, and first and second flanges provided at end portions of the winding core portion, and further includes a plate-shaped core bridged between the first and second flanges. In particular, the present disclosure relates to an improvement of an adhesive used for bonding the flanges and the plate-shaped core.

BACKGROUND ART

For example, Japanese Patent No. 5796603 discloses a coil component including a drum-shaped core made of a magnetic material and including a winding core portion, a plate-shaped core made of a magnetic material, and at least one wire wound around the winding core portion. FIG. 5 is based on FIG. 2(a) of Japanese Patent No. 5796603, and illustrates one flange 2 of a drum-shaped core 1 and a plate-shaped core 3 in the coil component.

The drum-shaped core 1 includes the winding core portion around which the wire is wound, and first and second flanges provided at end portions of the winding core portion. FIG. 5 illustrates the first flange 2 of the first and second flanges. The first flange 2 has an inner end surface (not illustrated) facing toward the winding core portion and holding the one end portion of the winding core portion in position, and an outer end surface 4 facing outward opposite to the inner end surface, and it interconnects the inner end surface and the outer end surface 4. The first flange 2 further has a bottom surface 5 facing toward a mount board in a mounted state, and a top surface 6 positioned on the opposite side to the bottom surface 5. Though not illustrated, the second flange has a symmetrical shape with respect to the first flange 2.

The plate-shaped core 3 has a lower principal surface 7 and an upper principal surface 8 facing in opposite directions. The plate-shaped core 3 is fixed to the first flange 2 and the second flange with an adhesive 9 interposed therebetween in a state that the lower principal surface 7 faces the top surface 6 and extends between the first flange 2 and the second flange.

Japanese Patent No. 5796603 proposes a structure capable of providing high bonding strength between the drum-shaped core 1 and the plate-shaped core 3 in spite of using a smaller amount of the adhesive 9. To explain the illustrated flange 2 in more detail, a flat surface 10 positioned at the highest level is formed in a central portion 11 of the top surface 6 of the flange 2, and sloped surfaces 12 and 13 are formed to gradually decline toward both end portions from the flat surface 10.

Thus, the top surface 6 of the flange 2 and the lower principal surface 7 of the plate-shaped core 3 are directly contacted with each other along the flat surface 10 in the central portion 11 of the top surface 6 with the adhesive 9 not interposed therebetween, and they are opposed to each other with the presence of a gap therebetween, the gap gradually narrowing toward the central portion 11 from the end portion of the top surface 6. The adhesive 9 is applied to the gap.

With the technique disclosed in Japanese Patent No. 5796603, because a capillary phenomenon can be caused to generate in the above-mentioned gap on the side closer to the central portion 11 in the vicinity of the flat surface 10 in the top surface 6, the gap between the flange 2 and the plate-shaped core 3 can be filled with a smaller amount of the adhesive 9. According to the disclosure, therefore, comparatively high bonding strength can be obtained between the drum-shaped core 1 and the plate-shaped core 3 with a comparatively small amount of the adhesive 9.

SUMMARY

Furthermore, Japanese Patent No. 5796603 discloses that an epoxy-based adhesive is used as the adhesive 9. As the epoxy-based adhesive, a thermosetting one-component epoxy-based resin is widely used because of such advantages as being easy to handle and having a long storage term. Usually, powder with particle size of several microns is dispersed as a hardener in the thermosetting one-component epoxy-based resin.

When the above-mentioned thermosetting one-component epoxy-based resin is used as the adhesive 9 illustrated in FIG. 5, there is a possibility that the epoxy-based resin spreads due to the capillary phenomenon, but a not-hardened portion may localize in the adhesive 9 because the hardener in the powder form cannot follow the capillary phenomenon. Such localization of the not-hardened portion causes reduction of the bonding strength.

The present disclosure provides a coil component having increased bonding strength between a drum-shaped core and a plate-shaped core, and a manufacturing method for the coil component.

According to one preferred embodiment of the present disclosure, there is provided a coil component including a drum-shaped core made of a magnetic material and including a winding core portion extending in an axial direction, and first and second flanges provided respectively at first and second end portions that are opposite to each other in the axial direction of the winding core portion. The coil component further includes a plate-shaped core made of a magnetic material and having a lower principal surface and an upper principal surface facing in opposite directions; and a wire wound around the winding core portion.

The first and second flanges have bottom surfaces facing toward a mount board in a mounted state, and top surfaces positioned on the opposite side to the bottom surfaces. The plate-shaped core is fixed to the first and second flanges with an adhesive interposed therebetween in a state that the lower principal surface faces the top surfaces of the first and second flanges.

The adhesive is made of a hardened epoxy-based resin containing dicyandiamide. The hardened epoxy-based resin containing dicyandiamide is obtained by hardening an epoxy-based resin with the dicyandiamide used as a hardener.

In the above coil component, preferably, the wire includes an insulating coating that is made of a resin different from the adhesive. The insulating coating made of a resin different from the adhesive does not contain dicyandiamide, preferably.

The present disclosure further relates to a manufacturing method for the above-described coil component.

According to another preferred embodiment of the present disclosure, there is provided a manufacturing method for the coil component. The method includes steps of preparing the drum-shaped core and the plate-shaped core, and fixing the plate-shaped core to the first and second flanges with an adhesive interposed therebetween in a state that the lower principal surface faces the top surfaces of the first and second flanges. The step of fixing the plate-shaped core to the first and second flanges includes a step of applying the adhesive by introducing an epoxy-based resin to between the plate-shaped core and the first and second flanges, and hardening the epoxy-based resin with dicyandiamide used as a hardener.

The above embodiments can provide the coil component having increased bonding strength between the flanges of the drum-shaped core and the plate-shaped core, and the manufacturing method for the coil component.

Other features, elements, characteristics and advantages of the present disclosure will become more apparent from the following detailed description of preferred embodiments of the present disclosure with reference to the attached drawings.

DETAILED DESCRIPTION

A coil component 20 according to a first embodiment, i.e., one practical example, of the present disclosure will be described below with reference to FIGS. 1A and 1B.

Figure 1A:
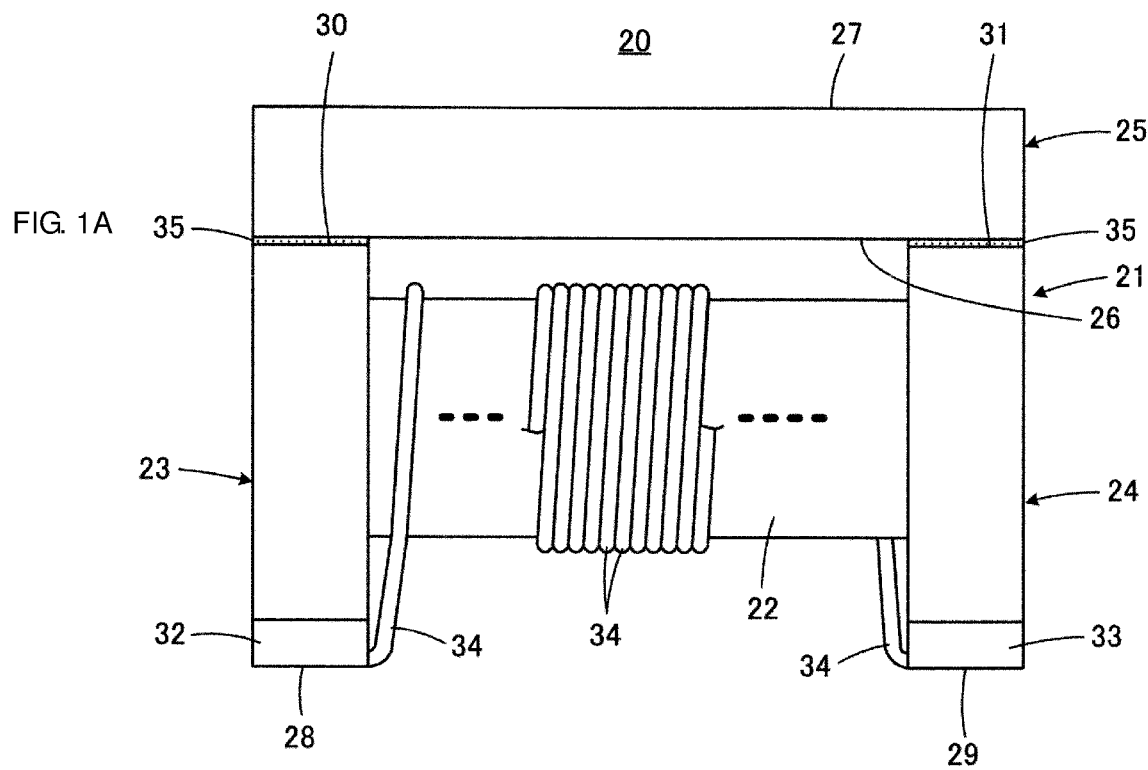
FIG. 1A is a front view and FIG. 1B is a left side view, with both views illustrating an external appearance of a coil component according to a first embodiment of the present disclosure.
Figure 1B:
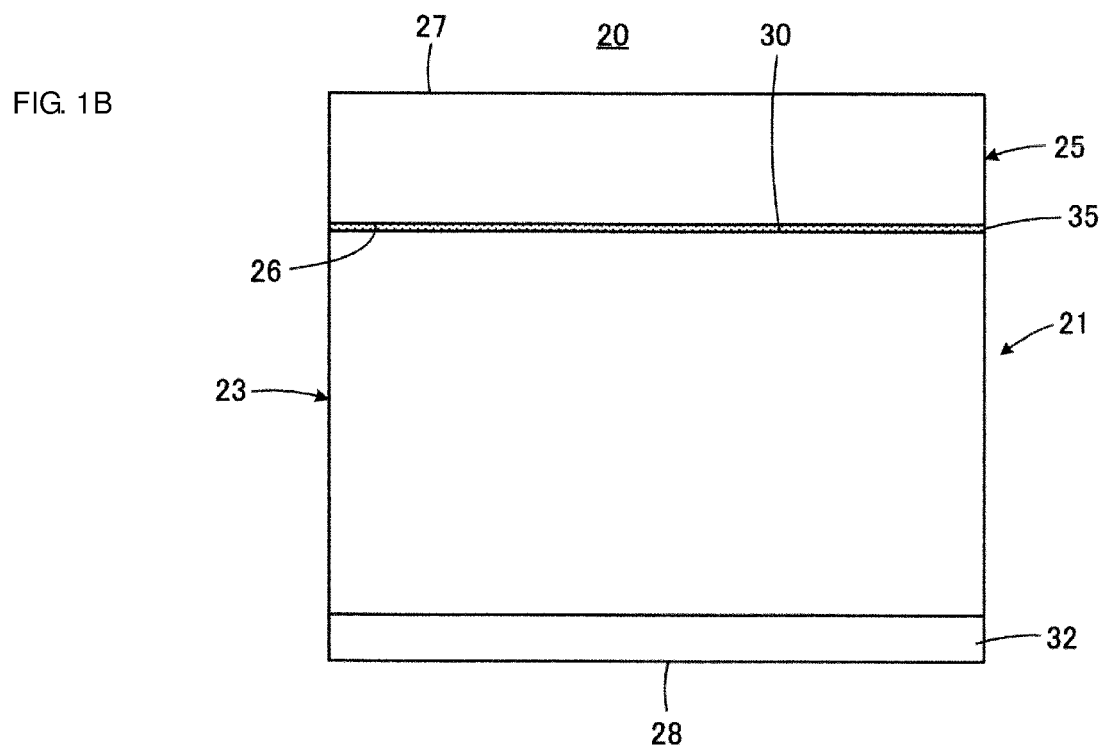

As illustrated in FIGS. 1A and 1B, the coil component 20 includes a drum-shaped core 21 made of a magnetic material, such as a magnetic substance, for example, ferrite, or a resin containing ferrite powder or magnetic metal powder. The drum-shaped core 21 includes a winding core portion 22 extending in an axial direction, and first and second flanges 23 and 24 provided respectively at first and second end portions that are opposite to each other in the axial direction of the winding core portion 22.

The coil component 20 further includes a plate-shaped core 25 bridged between the first and second flanges 23 and 24. The plate-shaped core 25 has a lower principal surface 26 and an upper principal surface 27 facing in opposite directions. As in the drum-shaped core 21, the plate-shaped core 25 is also made of a magnetic material, such as a magnetic substance, for example, ferrite, or a resin containing ferrite powder or magnetic metal powder. Thus, the plate-shaped core 25 and the drum-shaped core 21 cooperatively constitute a closed magnetic path.

The first and second flanges 23 and 24 have respectively bottom surfaces 28 and 29 facing toward a mount board (not illustrated) in a mounted state, and top surfaces 30 and 31 positioned on the opposite side to the bottom surfaces 28 and 29. The top surfaces 30 and 31 of the first and second flanges 23 and 24 are positioned to face the lower principal surface 26 of the plate-shaped core 25.

A first terminal electrode 32 is provided at the bottom surface 28 of the first flange 23, and a second terminal electrode 33 is provided at the bottom surface 29 of the second flange 24. The terminal electrodes 32 and 33 are each formed, for example, by coating a conductive paste, which contains conductive metal powder such as Ag powder, through immersion or application, baking the conductive paste, and further coating Ni and Sn plating layers. In another example, the terminal electrodes 32 and 33 may be formed by pasting conductive metal pieces made of a copper-based metal, such as tough pitch copper or phosphoric bronze, to the flanges 23 and 24.

A wire 34 is wound around the winding core portion 22. The wire 34 is, for example, a copper wire with an insulating coating made of a resin such as polyamide-imide, polyurethane, or polyesterimide. One end of the wire 34 is connected to the first terminal electrode 32, and the other end of the wire 34 is connected to the second terminal electrode 33. For example, heat pressure bonding, ultrasonic welding, or laser welding is used to connect the terminal electrodes 32 and 33 and the wire 34. The wire 34 may be wound in multiple layers as required.

An adhesive 35 is present between the lower principal surface 26 of the plate-shaped core 25 and the top surfaces 30 and 31 of the first and second flanges 23 and 24. The adhesive 35 fixes the plate-shaped core 25 to the drum-shaped core 21. In FIGS. 1A and 1B, a thickness of the adhesive 35 is illustrated in an exaggerated way for the sake of making them appreciable visually.

The adhesive 35 is made of a hardened epoxy-based resin containing dicyandiamide. The hardened epoxy-based resin containing dicyandiamide is obtained by hardening an epoxy-based resin with dicyandiamide used as a hardener. In this case, some of the dicyandiamide as the hardener remains in the hardened epoxy-based resin. It can be hence understood that the hardened epoxy-based resin serving as the adhesive 35 contains dicyandiamide as described above. That point can be confirmed from the fact that a cyan group is detected by the FT-IR method (Fourier Transform Infrared Spectroscopy). No cyan group is detected in a hardened epoxy-based resin containing no dicyandiamide as the hardener.

In manufacturing the coil component 20, the drum-shaped core 21 and the plate-shaped core 25 are prepared, and the plate-shaped core 25 is fixed to the first and second flanges 23 and 24 with the adhesive 35 interposed therebetween in a state that the lower principal surface 26 faces the top surfaces 30 and 31 of the flanges 23 and 24 of the drum-shaped core 21 and extends between the first and second flanges 23 and 24. In a step of fixing the plate-shaped core 25 to the first and second flanges 23 and 24, the epoxy-based resin is applied to between the plate-shaped core 25 and the first and second flanges 23 and 24, and is hardened to serve as the adhesive 35 with dicyandiamide used as the hardener. The hardening step is usually performed under heating.

It has been found that the adhesive 35 obtained by hardening the epoxy-based resin with dicyandiamide used as the hardener exhibits high bonding strength with respect to materials containing metals, such as ferrite. As a result of evaluating bonding strength of the epoxy-based resin in accordance with JIS K 6850, fracture strength is 17 MPa when a amine-based harder is used as the hardener, while fracture strength is as high as 25 MPa when dicyandiamide is used as the hardener. Such a result is presumably attributable to the fact that an OH group generated in an addition reaction of an epoxy group, which is caused by dicyandiamide, forms a hydrogen bond to a metal element contained in each of the drum-shaped core 21 and the plate-shaped core 25.

As described above, resins such as polyamide-imide, polyurethane, and polyesterimide are used as materials for the insulating coating of the wire 34. In other words, the insulating coating of the wire 34 is made of a resin different from the adhesive 35. Accordingly, the insulating coating of the wire 34 does not contain at least dicyandiamide. Thus, the wire 34 is not excessively hardened, and efficiency in winding work and durability after the winding can be improved.

A coil component 40 according to a second embodiment of the present disclosure will be described below with reference to FIGS. 2, 3, 4A and 4B. The coil component 40 constitutes, for example, a common-mode choke coil.

As in the above-described coil component 20, the coil component 40 includes a drum-shaped core 41 made of a magnetic material. The drum-shaped core 41 includes a winding core portion 42, and first and second flanges 43 and 44 provided respectively at first and second end portions that are opposite to each other in an axial direction of the winding core portion 42.

As in the above-described coil component 20, the coil component 40 further includes a plate-shaped core 45 made of a magnetic material and constituting a closed magnetic path in cooperation with the drum-shaped core 41. The plate-shaped core 45 has a lower principal surface 46 and an upper principal surface 47 facing in opposite directions.

The first and second flanges 43 and 44 have respectively bottom surfaces 48 and 49 facing toward a mount board (not illustrated) in a mounted state, and top surfaces 50 and 51 positioned on the opposite side to the bottom surfaces 48 and 49. The top surfaces 50 and 51 of the first and second flanges 43 and 44 are positioned to face the lower principal surface 46 of the plate-shaped core 45.

First and second terminal electrodes 52 and 53 (see FIG. 4B) are provided in the first flange 43 on the side closer to the bottom surface 48, and third and fourth terminal electrodes 54 and 55 (see FIGS. 2 and 3) are provided in the second flange 44 on the side closer to the bottom surface 49. The terminal electrodes 52 to 55 can be formed in a similar manner to that in the case of forming the above-described terminal electrodes 32 and 33.

Figure 2:
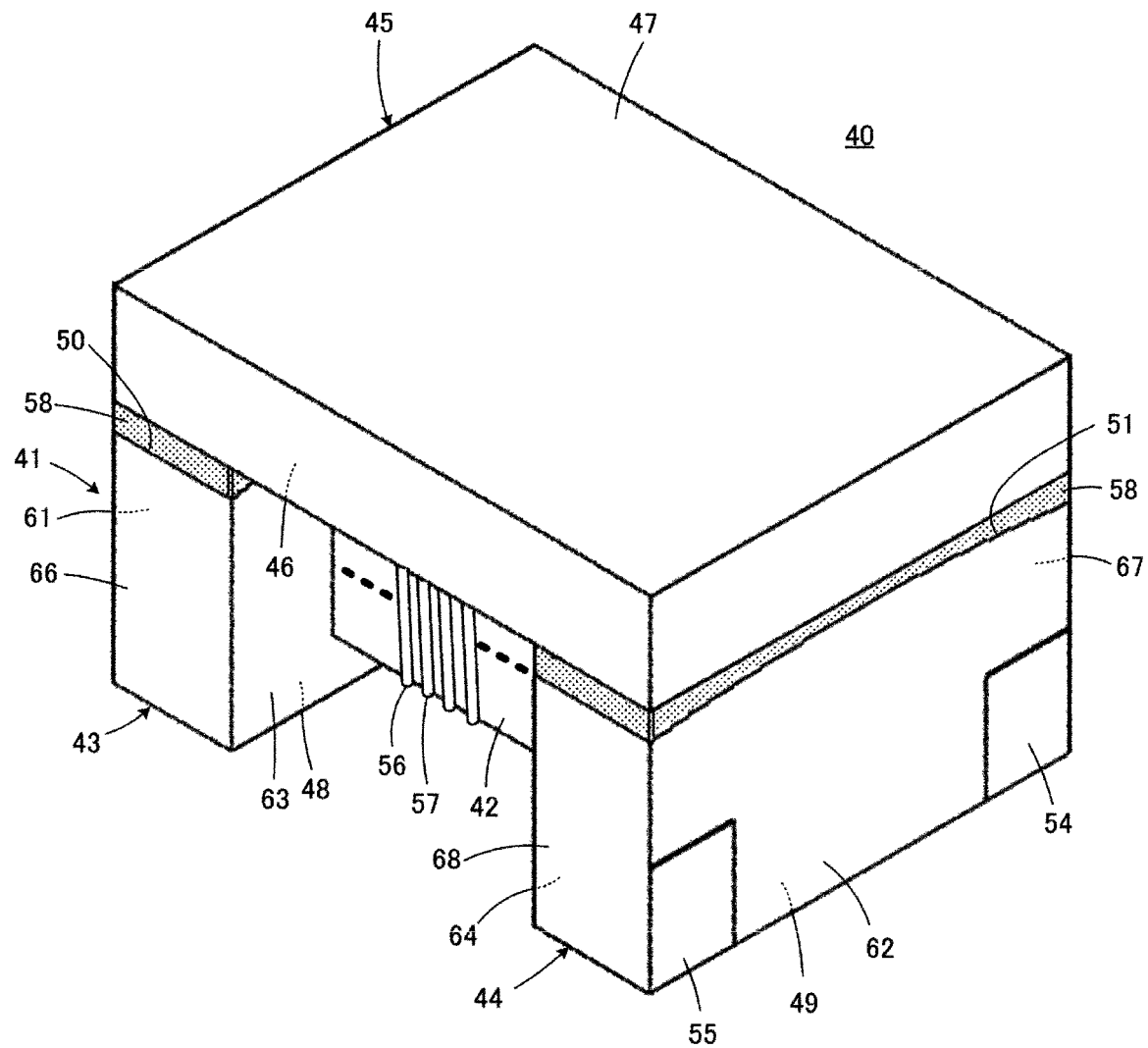
FIG. 2 is a perspective view illustrating an external appearance of a coil component according to a second embodiment of the present disclosure.
Figure 3:
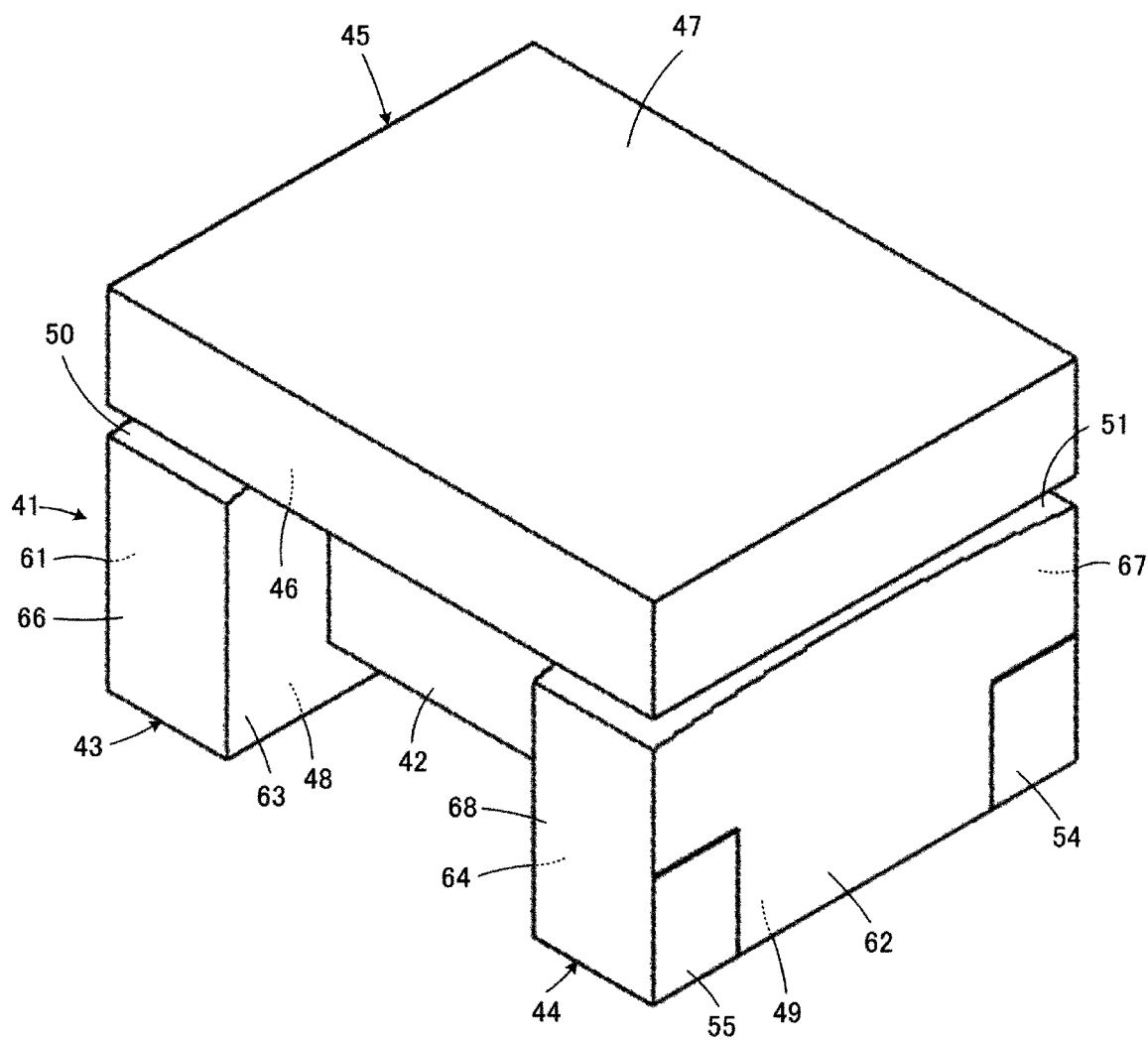
FIG. 3 is a perspective view illustrating a combined state of a drum-shaped core and a plate-shaped core in the coil component illustrated in FIG. 2.

For example, as illustrated in FIG. 2 in a simplified way, two wires, i.e., first and second wires 56 and 57, are spirally wound around the winding core portion 42 in the same direction. As in the above-described wire 34, the wires 56 and 57 are each, for example, a copper wire with an insulating coating made of a resin such as polyamideimide, polyurethane, or polyesterimide.

Though not specifically illustrated, a first end of the first wire 56 is connected to the first terminal electrode 52, and a second end of the first wire 56 on the opposite side to the first end is connected to the third terminal electrode 54. A first end of the second wire 57 is connected to the second terminal electrode 53, and a second end of the second wire 57 on the opposite side to the first end is connected to the fourth terminal electrode 55. For example, heat pressure bonding, ultrasonic welding, or laser welding is used to connect the terminal electrodes 52 to 55 and the wires 56 and 57. The wires 56 and 57 may be each wound in multiple layers as required.

As illustrated in FIG. 2, an adhesive 58 is present between the lower principal surface 46 of the plate-shaped core 45 and the top surfaces 50 and 51 of the first and second flanges 43 and 44. The adhesive 58 fulfils a similar function to that of the adhesive 35, and is made of a similar material, i.e., a hardened epoxy-based resin containing dicyandiamide.

The coil component 40 according to the second embodiment is different from the coil component 20 according to the first embodiment in the following point.

Figure 4A:
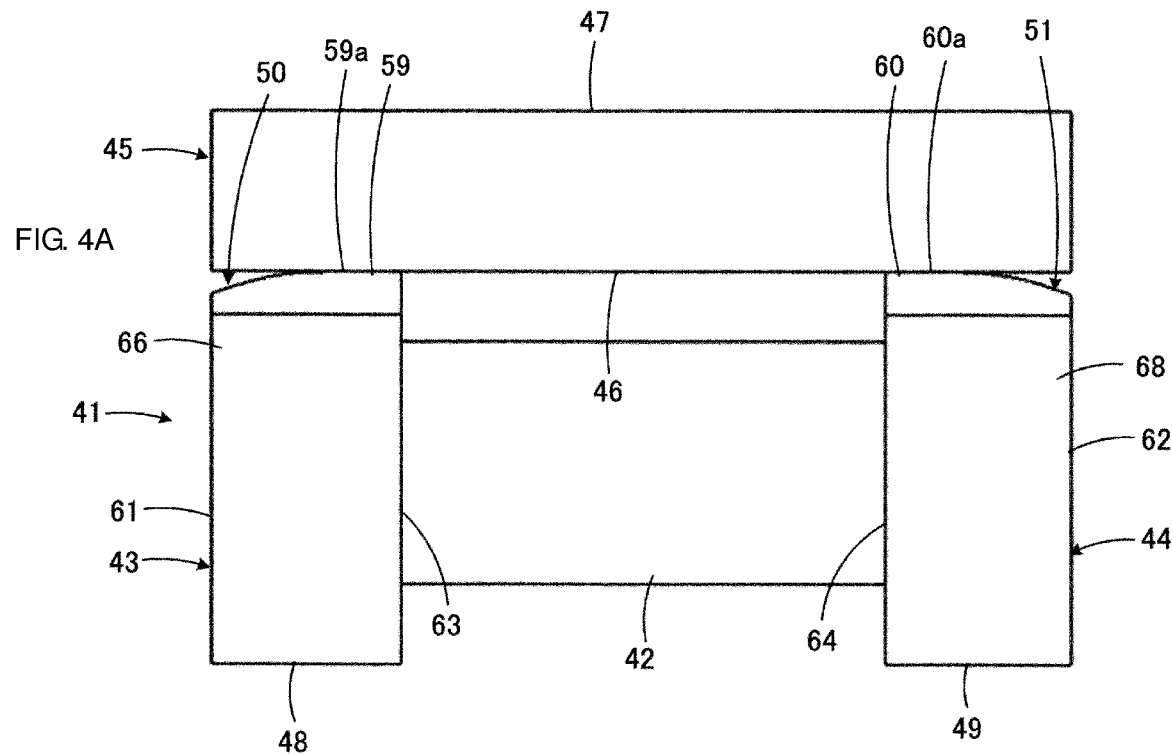
FIG. 4A is a front view and FIG. 4B is a left side view, with both views illustrating a combined state of the drum-shaped core and the plate-shaped core illustrated in FIG. 3.
Figure 4B:
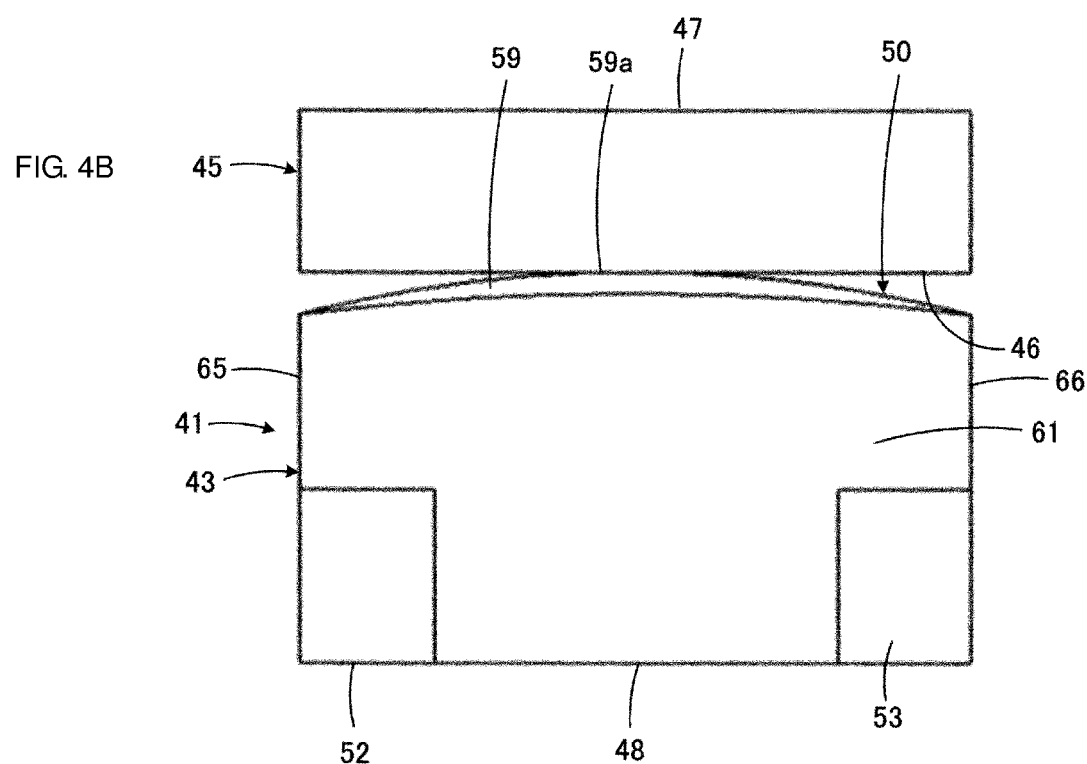
Figure 5:
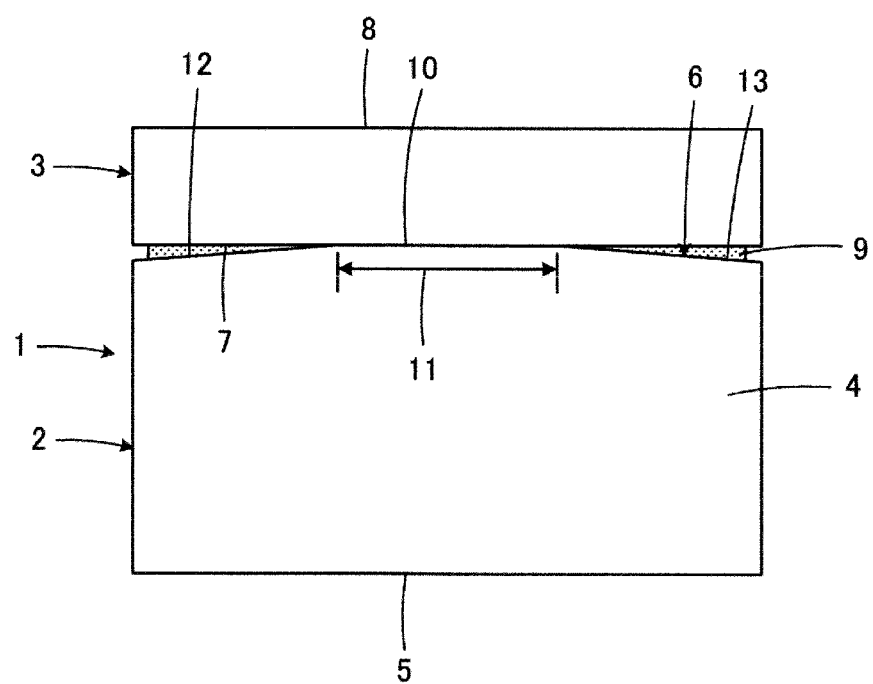
FIG. 5 is a side view illustrating one flange of a drum-shaped core and a plate-shaped core in a coil component disclosed in Japanese Patent No. 5796603.

Looking at the top surfaces 50 and 51 of the first and second flanges 43 and 44, as clearly illustrated in FIGS. 4A and 4B, first and second bulged portions 59 and 60 are provided respectively on the top surfaces 50 and 51. An uppermost region 59a of the first bulged portion 59 is positioned closer to an inner end surface 63 of the first flange 43 than an outer end surface 61 thereof. An uppermost region 60a of the second bulged portion 60 is positioned closer to an inner end surface 64 of the second flange 44 than an outer end surface 62 thereof. As a result, the top surfaces 50 and 51 of the first and second flanges 43 and 44 are formed such that the uppermost regions 59a and 60a are positioned closer to the lower principal surface 46 of the plate-shaped core 45 than peripheral regions of the top surfaces 50 and 51.

In this embodiment, zones where the top surfaces 50 and 51 of the first and second flanges 43 and 44 are closest to the lower principal surface 46 of the plate-shaped core 45 are given by the uppermost regions 59a and 60a. With the above-described configuration, a stable magnetic path can be realized in a shorter-path portion in the magnetic path that is formed by the drum-shaped core 41 and the plate-shaped core 45.

When the uppermost region 59a and 60a of the bulged portions 59 and 60 are positioned closer to the inner end surfaces 63 and 64 of the flanges 43 and 44 as described above, magnetic resistance can be reduced in a shorter-path portion in the magnetic path formed by the drum-shaped core 41 and the plate-shaped core 45. Therefore, inductance can be more efficiently obtained.

Furthermore, unlike the structure disclosed in Japanese Patent No. 5796603, when bonding the drum-shaped core 41 and the plate-shaped core 45, there is no need of intentionally providing specific zones where the top surfaces 50 and 51 of the first and second flanges 43 and 44 are directly contacted with the lower principal surface 46 of the plate-shaped core 45. Accordingly, a wider bonding area of the adhesive 58 can be ensured.

Particularly, in this embodiment, though not clearly illustrated, the adhesive 58 is present over the entire regions or substantially the entire regions where the top surfaces 50 and 51 of the first and second flanges 43 and 44 face the lower principal surface 46 of the plate-shaped core 45, including the zones where the bulged portions 59 and 60 face the lower principal surface 46 of the plate-shaped core 45. With that configuration, the adhesive 58 can be introduced to between the flanges 43, 44 and the plate-shaped core 45 without resorting to the capillary phenomenon, and a bonding area between the flanges 43, 44 and the plate-shaped core 45 can be increased certainly. As a result, bonding strength between the flanges 43, 44 and the plate-shaped core 45 can be enhanced reliably.

Moreover, this embodiment is featured, as clearly illustrated in FIG. 4A, in that, on the side closer to the outer end surfaces 61 and 62 than the uppermost regions 59a and 60a, gaps between the top surfaces 50, 51 of the first and second flanges 43 and 44 and the lower principal surface 46 of the plate-shaped core 45 gradually widens from the inner end surfaces 63 and 64 of the flanges 43 and 44 toward the outer end surfaces 61 and 62. With that configuration, the adhesive 58 can be smoothly introduced to between the top surfaces 50, 51 of the flanges 43 and 44 and the lower principal surface 46 of the plate-shaped core 45.

Assuming that a direction perpendicular to the extending direction of the winding core portion 42 and perpendicular to the direction in which the bottom surfaces 48 and 49 of the flanges 43 and 44 face the top surfaces 50 and 51 is called a width direction, as clearly illustrated in FIG. 4B, the uppermost regions 59a and 60a of the first and second bulged portions 59 and 60 are positioned in central zones of the top surfaces 50 and 51 of the first and second flanges 43 and 44 in the width direction. Moreover, the gaps between the top surfaces 50, 51 of the first and second flanges 43 and 44 and the lower principal surface 46 of the plate-shaped core 45 gradually widens from the central zones of the flanges 43 and 44 in the width direction toward lateral surfaces 65, 66 and lateral surfaces 67, 68. Also with that configuration, the adhesive 58 can be smoothly introduced to between the top surfaces 50, 51 of the flanges 43 and 44 and the lower principal surface 46 of the plate-shaped core 45.

The present disclosure has been described in connection with the illustrated embodiments, but the present disclosure can be variously modified within the scope of the present disclosure.

For instance, coil components embodying the present disclosure may constitute a transformer, a balun, etc. other than those constituting a single coil and a common-mode choke coil as in the illustrated embodiments. Thus, the number of wires is also changed depending on the functions of the coil components. The number of terminal electrodes provided in each flange is further changed correspondingly.

Shapes of the drum-shaped core and the plate-shaped core included in the coil component are not limited to the illustrated one, and can be optionally changed depending on the desired design.

The coil component according to the present disclosure can be constituted by replacing or combining parts of constituent elements between the different embodiments described in this specification.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component comprising:
    a drum-shaped core made of a magnetic material and including a winding core portion extending in an axial direction, and first and second flanges provided respectively at first and second end portions that are opposite to each other in the axial direction of the winding core portion, the first and second flanges having bottom surfaces facing toward a mount board in a mounted state, and top surfaces positioned on opposite side to the bottom surfaces;
    a plate-shaped core made of a magnetic material and having a lower principal surface and an upper principal surface facing in opposite directions, the plate-shaped core being fixed to the first and second flanges with an adhesive made of a hardened epoxy-based resin containing dicyandiamide interposed therebetween in a state that the lower principal surface faces the top surfaces of the first and second flanges; and
    a wire wound around the winding core portion;
    wherein at least one of the first and second flanges has a bulged portion facing the lower principal surface of the plate-shaped core, and the bulged portion has an uppermost region that is positioned closer to an inner end surface of the at least one of the first and second flanges than an outer end surface of the at least one of the first and second flanges.

2. The coil component according to claim 1, wherein the bulged portion is positioned in a central zone of the top surface of the at least one of the first and second flanges in a width direction of the at least one of the first and second flanges.

3. The coil component according to claim 1, wherein
    the uppermost region of the bulged portion is closest to the lower principal surface of the plate-shaped core in a central zone of the top surface of the at least one of the first and second flanges in a width direction of the at least one of the first and second flanges.

4. The coil component according to claim 1, wherein each of the first and second flanges has a respective bulged portion facing the lower principal surface of the plate-shaped core.

5. The coil component according to claim 4, wherein the respective bulged portion is positioned in a respective central zone of the top surface of each of the first and second flanges in a respective width direction of each of the first and second flanges.

6. The coil component according to claim 1, wherein the wire includes an insulating coating that is made of a resin different from the adhesive.

7. The coil component according to claim 6, wherein at least one of the first and second flanges has a bulged portion facing the lower principal surface of the plate-shaped core.

8. The coil component according to claim 7, wherein the bulged portion is positioned in a central zone of the top surface of the at least one of the first and second flanges in a width direction of the at least one of the first and second flanges.

9. The coil component according to claim 6, wherein each of the first and second flanges has a respective bulged portion facing the lower principal surface of the plate-shaped core.

10. The coil component according to claim 9, wherein the respective bulged portion is positioned in a respective central zone of the top surface of each of the first and second flanges in a respective width direction of each of the first and second flanges.

11. A manufacturing method for a coil component, the method comprising:
    preparing a drum-shaped core made of a magnetic material and including a winding core portion extending in an axial direction, and first and second flanges provided respectively at first and second end portions that are opposite to each other in the axial direction of the winding core portion, the first and second flanges having bottom surfaces facing toward a mount board in a mounted state, and top surfaces positioned on opposite side to the bottom surfaces;

winding a wire around the winding core portion;

preparing a plate-shaped core made of a magnetic material and having a lower principal surface and an upper principal surface facing in opposite directions; and fixing the plate-shaped core to the first and second flanges with an adhesive interposed therebetween in a state that the lower principal surface faces the top surfaces of the first and second flanges, the fixing including applying the adhesive by introducing an epoxy-based resin to between the plate-shaped core and the first and second flanges, and hardening the epoxy-based resin with dicyandiamide used as a hardener, and wherein at least one of the first and second flanges has a bulged portion facing the lower principal surface of the plate-shaped core, and the bulged portion has an uppermost region that is positioned closer to an inner end surface of the at least one of the first and second flanges than an outer end surface of the at least one of the first and second flanges.

12. The coil component according to claim 11, wherein the uppermost region of the bulged portion is closest to the lower principal surface of the plate-shaped core in a central zone of the top surface of the at least one of the first and second flanges in a width direction of the at least one of the first and second flanges.

13. A manufacturing method for a coil component, the method comprising:

preparing a drum-shaped core made of a magnetic material and including a winding core portion extending in an axial direction, and first and second flanges provided respectively at first and second end portions that are opposite to each other in the axial direction of the winding core portion, the first and second flanges having bottom surfaces facing toward a mount board in a mounted state, and top surfaces positioned on opposite side to the bottom surfaces;

winding a wire around the winding core portion;

preparing a plate-shaped core made of a magnetic material and having a lower principal surface and an upper principal surface facing in opposite directions; and fixing the plate-shaped core to the first and second flanges with an adhesive interposed therebetween in a state that the lower principal surface faces the top surfaces of the first and second flanges, the fixing including applying the adhesive by introducing an epoxy-based resin to between the plate-shaped core and the first and second flanges, and hardening the epoxy-based resin with dicyandiamide used as a hardener, and the wire includes an insulating coating that is made of a resin different from the adhesive, and wherein at least one of the first and second flanges has a bulged portion facing the lower principal surface of the plate-shaped core, and the bulged portion has an uppermost region that is positioned closer to an inner end surface of the at least one of the first and second flanges than an outer end surface of the at least one of the first and second flanges.

14. The coil component according to claim 13, wherein the uppermost region of the bulged portion is closest to the lower principal surface of the plate-shaped core in a central zone of the top surface of the at least one of the first and second flanges in a width direction of the at least one of the first and second flanges.

\* \* \* \* \*